Nov. 14, 1933.  DE LANCEY W. DAVIS ET AL  1,935,114

LUBRICATED BEARING LINER OR BRASS

Original Filed Dec. 18, 1931

Inventors
De Lancey W. Davis
and John P. Laux
By Brown & Phelps
Attorneys

Patented Nov. 14, 1933

1,935,114

UNITED STATES PATENT OFFICE 1,935,114

LUBRICATED BEARING LINER OR BRASS

De Lancey W. Davis, Hazleton, and John P. Laux, Bethlehem, Pa.

Original application December 18, 1931, Serial No. 581,962. Divided and this application March 15, 1933. Serial No. 660,980

3 Claims. (Cl. 308—79)

The invention relates to bearing liners popularly known in the art as brasses.

An object of the invention is the provision of a brass having means for lubricating the bearing by means of force-feed lubrication.

It is a further object of the invention to provide a brass having a bore provided with means for attachment of a lubricant conduit and grooves in the bearing surface of the liner in communication with said bore.

It is a further object of the invention to provide a brass having lubricant grooves in its surface formed to evenly distribute lubricant over the surface of the bearing.

It is a further object of the invention to provide brasses having lubricant grooves in communication with a conduit formed in the body of the liner adapted for rotation in either direction or for rotation in a particular direction and to evenly distribute lubrication over the surface of the bearing in either instance.

It is a further object of the invention to provide a bearing having lubricant grooves designed to evenly distribute the force-feed lubrication over the surface of the bearing in combination with means to convey lubricant to an end surface of the liner for lubrication of the hub or guard plate.

Further objects of the invention will appear from the following description when read in connection with the accompanying drawing showing illustrative embodiments of the invention and wherein:—

Figure 1:
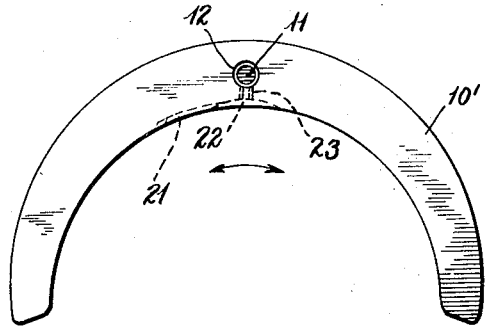
Figs. 1 and 2 are an end view and a bottom plan view respectively.
Figure 2:
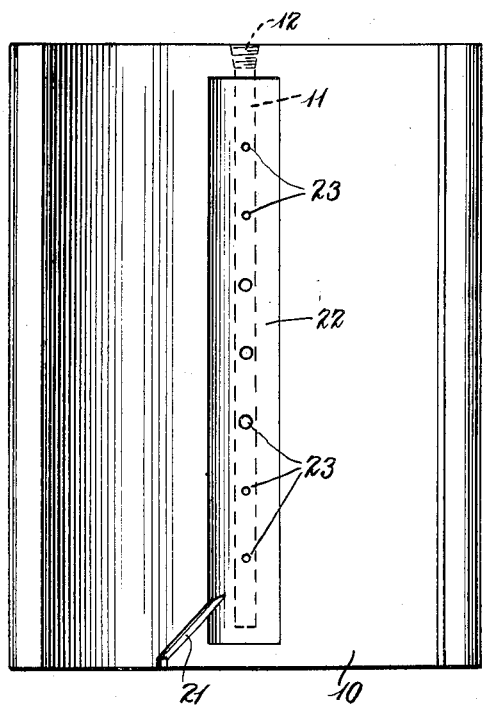

The form of the invention shown in Figs. 1 and 2 is particularly adapted for use in a bearing upon a vehicle wherein the member moving in the bearing is in service rotated substantially substantially indiscriminately in both directions, as for instance upon a switch locomotive driving or truck bearing or upon a freight car. For this service a bore 11 is shown opening as at 12 into an end surface of the bearing, said opening being internally screwthreaded for attachment of a lubricant-delivering conduit. In this form of the invention the bore is parallel with the bearing surface and is continued in this direction through a major portion of the longitudinal extent of the metal body 10. A groove 22 is shown in the bearing surface of the body, the groove being shown as deepest at its central portion and tapering in depth in both directions from the center.

To deliver oil with substantial uniformity throughout the groove 22, a plurality of openings 23 from the bore to the bottom of the groove is shown and the openings adjacent the center of the bearing are larger than those toward the ends thereof, desirably gradually reduced in size as the ends of the bearing are approached.

Figure 3:
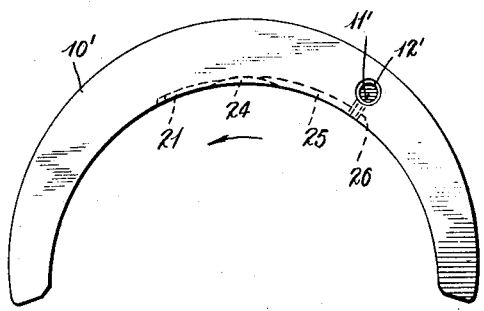
Figs. 3 and 4 are an end view and a bottom plan view respectively of a modification.
Figure 4:
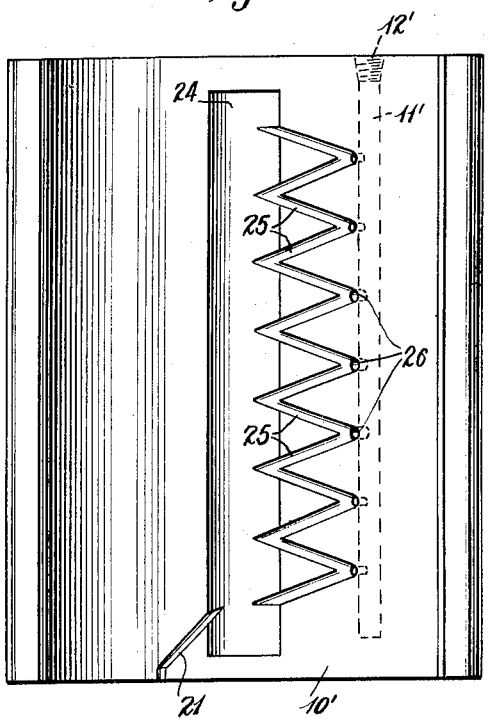

In the form of Figs. 3 and 4 designed for a bearing rotating ordinarily in the same direction as upon a passenger locomotive, the bore 11' is shown as displaced from the center of the bearing counter to the direction of rotation of the journal and a centrally located groove 24 is provided in the bearing surface, its walls formed as indicated for the walls of groove 22 in Figs. 1 and 2.

To conduct lubricant from the bore 11' to the groove 24, there are shown a series of pairs of grooves 25, each pair diverging from an outlet opening 26 from the bore 11', the adjacent legs of the respective pairs shown as opening into the groove 24 at substantially the same point.

The openings 26 are formed in the same manner as the openings 23 gradually reduced in size toward the ends of the bearing from the longitudinal center thereof.

By the above arrangement of the grooves 25, all points of the central portion of the journal will sweep over not only the groove 24 but at least one of the grooves 25 in its rotation thereby providing a very effective lubrication of the journal bearing.

To conduct lubricant to the end surface of the bearing liner to lubricate the surface of a hub plate there is shown in both forms of the invention a shallow groove 21 extending from a point adjacent the end of the groove 22 or 24 to the end surface of the liner.

In the form of the invention of Figs. 1 and 2 the lubricant will be fed evenly to the bearing surface in either direction of rotation of the journal.

In the form of Figs. 3 and 4 which is intended to revolve preponderantly in the direction of the arrow on Fig. 3, the bore 11' is so located as to feed oil in the direction of revolution of the journal, which oil will be carried around to the lower portion of the bearing which, as is well known, is always slightly spaced from the journal, since the weight is borne by the upper brass, and from said space adheres to the journal to be again carried upwardly between the weight transmitting surfaces, and an effective film of oil will be preserved at all times upon which the weight of the vehicle will float.

While the groove 24 is shown as at the center of the bearing, it will be obvious that it may be displaced from the center and still secure the objects of the invention.

The present application is a division of our copending application Serial No. 581,962, filed December 18, 1931.

Minor changes may be made in the physical embodiments of the invention within the scope of the appended claims without departing from the spirit thereof.

We claim:

1. A bearing liner comprising a bearing metal body having a bore opening to a non-bearing surface, said opening formed for attachment of a lubricant-delivering conduit, and having a longitudinal groove in its bearing surface, a plurality of openings from said bore to said bearing surface and in communication with said groove at spaced points throughout its length, said openings decreasing in size from the center of said groove toward the ends thereof.

2. A bearing liner comprising a bearing metal body having a bore opening to a non-bearing surface, said opening formed for attachment of a lubricant-delivering conduit, and having a longitudinal groove in its bearing surface, said groove having in its bottom a plurality of openings in communication with said bore, said openings decreasing in size from the center of said groove toward the ends thereof.

3. A bearing liner comprising a bearing metal body having a bore substantially parallel with its bearing surface and an inlet for reception of lubricant under pressure, and a plurality of openings from said bore to the bearing surface, said bearing surface formed with a longitudinal groove displaced from said openings and a plurality of grooves in communication at their ends with all of said openings and extending diagonally of the axis of said bearing surface to and communicating with said longitudinal groove.

DE LANCEY W. DAVIS.
JOHN P. LAUX.